US012491393B1

(12) United States Patent
Broidy

(10) Patent No.: US 12,491,393 B1
(45) **Date of Patent: *Dec. 9, 2025**

(54) FIRE SUPPRESSION SYSTEM

(71) Applicant: ACME GROUP, LLC, Carson City, NV (US)

(72) Inventor: Frank Broidy, Carson, CA (US)

(73) Assignee: ACME GROUP, LLC, Carson City, NV (US)

( * ) Notice: Subject to any disclaimer, the term of this patent is extended or adjusted under 35 U.S.C. 154(b) by 775 days.

This patent is subject to a terminal disclaimer.

(21) Appl. No.: 17/736,939

(22) Filed: May 4, 2022

Related U.S. Application Data

(63) Continuation-in-part of application No. 16/926,793, filed on Jul. 13, 2020, now Pat. No. 11,883,700,
(Continued)

(51) Int. Cl.
*A62C 35/02* (2006.01)
*A62C 13/76* (2006.01)
(Continued)

(52) U.S. Cl.
CPC ............ *A62C 35/023* (2013.01); *A62C 13/76* (2013.01); *A62C 13/78* (2013.01); *A62C 31/28* (2013.01);
(Continued)

(58) Field of Classification Search
CPC ....... A62C 35/68; A62C 35/60; A62C 35/605; A62C 35/62; A62C 35/02; A62C 35/023;
(Continued)

(56) References Cited

U.S. PATENT DOCUMENTS 2,287,873 A 6/1942 Eric et al.
3,097,499 A 7/1963 Rodgers et al.
(Continued)

FOREIGN PATENT DOCUMENTS

GB 518717 A 3/1940
WO WO-2005033567 A1 * 4/2005 ........... F16K 17/366

OTHER PUBLICATIONS

Applicant Interview Summary for U.S. Appl. No. 15/183,734, dated May 28, 2019, 3 pages.
(Continued)

*Primary Examiner* — Christopher R Dandridge
(74) *Attorney, Agent, or Firm* — Buchalter, a Professional Corporation

(57) ABSTRACT

The present system provides an integrated fire suppression system that enables use of hybrid media fire-extinguishing systems and methods, and which includes all components in a single integrated control panel and cabinet, other than system piping to nozzles or emitters. The system enables the entire panel and cabinet to be inspected and analyzed, and installed, repaired, or maintained in a single operation, dramatically reducing time spent on site and reducing the qualifying process as well. The assembly of the panel is off-site, typically under the inspection of any qualifying agencies. Once assembled, the system can remain qualified for rapid installation at any future time, allowing easy replacement of faulty panels or consumables.

20 Claims, 3 Drawing Sheets

Related U.S. Application Data which is a continuation of application No. 15/183,734, filed on Jun. 15, 2016, now Pat. No. 10,709,916, and a continuation of application No. 13/873,143, filed on Apr. 29, 2013, now Pat. No. 9,393,451.

(60) Provisional application No. 61/639,844, filed on Apr. 27, 2012.

(51) Int. Cl.

| | |
|---|---|
| ***A62C 13/78*** | (2006.01) |
| ***A62C 31/28*** | (2006.01) |
| ***A62C 33/00*** | (2006.01) |
| ***A62C 33/04*** | (2006.01) |
| ***A62C 35/20*** | (2006.01) |
| ***A62C 35/58*** | (2006.01) |
| ***A62C 35/68*** | (2006.01) |

(52) U.S. Cl.

CPC .............. *A62C 33/00* (2013.01); *A62C 33/04* (2013.01); *A62C 35/20* (2013.01); *A62C 35/58* (2013.01); *A62C 35/68* (2013.01)

(58) Field of Classification Search

CPC ......... A62C 35/11; A62C 31/28; A62C 99/00; A62C 99/009; A62C 13/76; A62C 13/78; A62C 33/00; A62C 33/04; A62C 35/13; A62C 35/20; A62C 35/58; A62C 3/00

See application file for complete search history.

(56) References Cited

U.S. PATENT DOCUMENTS

| | | | | | |
|---|---|---|---|---|---|
| 3,878,896 | A | | 4/1975 | White et al. | |
| 3,977,474 | A | * | 8/1976 | Boegli | A62C 35/58 169/14 |
| 4,174,711 | A | | 11/1979 | Laing et al. | |
| 4,356,870 | A | | 11/1982 | Gaylord et al. | |
| 4,819,732 | A | | 4/1989 | Laumeister | |
| 5,061,022 | A | * | 10/1991 | Meriwether | E05C 7/04 49/367 |
| 5,273,060 | A | | 12/1993 | Hill, III et al. | |
| 5,560,693 | A | | 10/1996 | Musser et al. | |
| 5,808,541 | A | * | 9/1998 | Golden | A62C 37/40 340/630 |
| 5,850,876 | A | * | 12/1998 | Allison | F17C 7/02 169/61 |
| 6,752,217 | B2 | | 6/2004 | Reilly | |
| 7,264,178 | B1 | | 9/2007 | Hugg | |
| 7,686,093 | B2 | | 3/2010 | Reilly et al. | |
| 7,721,811 | B2 | | 5/2010 | Reilly et al. | |
| 7,726,408 | B2 | | 6/2010 | Reilly et al. | |
| 7,775,292 | B1 | | 8/2010 | Romanco | |
| 7,921,927 | B2 | | 4/2011 | Reilly et al. | |
| 8,141,798 | B2 | | 3/2012 | Reilly et al. | |
| 8,230,939 | B1 | | 7/2012 | Reynolds | |
| 8,376,059 | B2 | | 2/2013 | Reilly et al. | |
| 8,973,670 | B2 | | 3/2015 | Enk, Sr. | |
| 9,393,451 | B2 | | 7/2016 | Broidy | |
| 10,532,237 | B2 | | 1/2020 | Reilly et al. | |
| 10,709,916 | B2 | | 7/2020 | Broidy | |
| 11,298,573 | B2 | | 4/2022 | Van Der Stokker | |
| 11,883,700 | B1 | | 1/2024 | Broidy | |
| 12,420,126 | B1 | | 9/2025 | Broidy | |
| 2006/0005880 | A1 | | 1/2006 | Baker et al. | |
| 2006/0175067 | A1 | * | 8/2006 | Cover | A62C 13/76 169/30 |
| 2007/0103325 | A1 | | 5/2007 | Wagner et al. | |
| 2008/0257566 | A1 | * | 10/2008 | Shattuck | A62C 13/76 169/30 |
| 2011/0121034 | A1 | | 5/2011 | Swab et al. | |
| 2013/0284465 | A1 | | 10/2013 | Broidy | |
| 2016/0296777 | A1 | | 10/2016 | Broidy | |
| 2023/0201403 | A1 | | 6/2023 | Feuchter | |

OTHER PUBLICATIONS

Applicant Interview Summary for U.S. Appl. No. 15/183,734, dated Oct. 10, 2018, 3 pages.

Examiner Interview Summary for U.S. Appl. No. 16/926,793, dated Jun. 15, 2022, 2 pages.

Final Office Action for U.S. Appl. No. 13/873,143, dated Jul. 9, 2015, 10 pages.

Final Office Action for U.S. Appl. No. 15/183,734, dated Apr. 24, 2018, 13 pages.

Final Office Action for U.S. Appl. No. 15/183,734, dated Aug. 5, 2019, 10 pages.

Non-Final Office Action for U.S. Appl. No. 13/873,143, dated Oct. 3, 2014, 11 pages.

Non-Final Office Action for U.S. Appl. No. 13/873,143, dated Oct. 7, 2015, 7 pages.

Non-Final Office Action for U.S. Appl. No. 15/183,734, dated Aug. 16, 2016, 8 pages.

Non-Final Office Action for U.S. Appl. No. 15/183,734, dated Dec. 17, 2018, 10 pages.

Non-Final Office Action for U.S. Appl. No. 15/183,734, dated Nov. 15, 2016, 6 pages.

Non-Final Office Action for U.S. Appl. No. 15/183,734, dated Oct. 6, 2017, 8 pages.

Non-Final Office Action for U.S. Appl. No. 17/184,557, dated Mar. 13, 2025, 7 pages.

Notice of Allowance for U.S. Appl. No. 13/873,143, dated Apr. 12, 2016, 8 pages.

Notice of Allowance for U.S. Appl. No. 15/183,734, dated Mar. 6, 2020, 10 pages.

Restriction Requirement for U.S. Appl. No. 16/926,793, dated Mar. 29, 2022, 5 pages.

Restriction Requirement for U.S. Appl. No. 17/184,557, dated Mar. 8, 2024, 5 pages.

Restriction Requirement for U.S. Appl. No. 17/184,557, dated Nov. 19, 2024, 6 pages.

Non-Final Office Action for U.S. Appl. No. 16/926,793, dated Nov. 18, 2022, 27 pages.

Notice of Allowance for U.S. Appl. No. 16/926,793, dated Sep. 7, 2023, 6 pages.

Applicant Initiated Interview Summary for U.S. Appl. No. 17/184,557, dated Apr. 8, 2025, 4 pages.

Notice of Allowance for U.S. Appl. No. 17/184,557, dated May 15, 2025, 9 pages.

* cited by examiner

FIRE SUPPRESSION SYSTEM

CROSS-REFERENCE TO RELATED APPLICATIONS

This patent application is a continuation in part of U.S. patent application Ser. No. 16/926,793, filed Jul. 13, 2020, now U.S. Pat. No. 11,883,700, which is continuation of U.S. patent application Ser. No. 15/183,734 filed Jun. 15, 2016, now U.S. Pat. No. 10,709,916, and Ser. No. 13/873,143 filed Apr. 29, 2013, now U.S. Pat. No. 9,393,451, both entitled "INTEGRATED PANEL FOR FIRE SUPPRESSION SYSTEM," and which claim the benefit of priority of U.S. Provisional Patent Application No. 61/639,844 of the same title and filed Apr. 27, 2012, each of which is incorporated by reference herein in their entirety.

BACKGROUND

Certain installations require, by statute, code, or for some other reason, that built in fire suppression systems be provided. In some cases, these systems comprise a simple water sprinkler system that is activated via some environmental trigger (e.g. heat, smoke, and the like). In other cases, more complex systems are required that must meet certain standards for performance and must also pass certain standards of construction and installation. In some cases, there may be regulations for any and all equipment, whether related to the fire suppression system or not.

Those skilled in the related technologies should recognize generally at least four classes of fire that include Class A—combustible materials, B—flammable or combustible liquids and gasses, C—energized electrical equipment fires, and D—combustible metals. Any class of such fires require three things to persist once ignited, which some of those working in the field also refer to as a fire triangle, wherein the three sides or legs include a fuel source, heat, and oxygen. Typically, the fuel source is fixed and cannot be easily removed during a fire, such that either heat or oxygen or both must be removed or reduced to extinguish or suppress the fire.

In the prior art, certain complex fire suppression systems have typically been component based, where each component of the system is installed separately and combined with other components to provide the required fire suppression capability. There are a number of disadvantages of such an approach.

In cases where all materials have to be graded and approved, each separate component must pass the review process prior to installation. This can take a significant amount of time, severely delaying installation of original systems, or repair of existing systems. Often the sources of the components in the prior art are separate and independent companies, adding to the expense and delay of installation.

One particular environment where such prior art systems suffer from severe disadvantages is the nuclear industry, which must address fire extinguishment and suppression of not only Class A, B, and C fires, but also Class D fires that may involve nuclear and other combustible metals. There are strict requirements (e.g. Nuclear Quality Assurance level 1, "NQA-1) that each component must meet. With each component being installed by a different team, the man-hours required for installation, maintenance, and repair are multiplied. Any work at a nuclear site must be supervised by a security team. The component system requires a large security team working many hours during all such processes. This adds overhead, cost, and scheduling complexity to the process.

Even in non-nuclear environments, building and safety codes may require inspection, certification, UL approval, and/or other conditions to be satisfied prior to installation and operation of the system.

FIG. 1 is an example of a prior art component based system. The system includes a plurality of tanks 101. These tanks can contain some fluid or gas to be used with the fire suppression system. Each tank requires a space in a mounting rack and coupling through piping to the remainder of the system. At some other location a control panel 102, for controlling fluid flows and mixing of water from water tank 106 and the material from tanks 101, is installed on the wall or in some desired location. The component system may also include back up battery power 103, FACP-fire alarm control panel 104, and auxiliary power supply 105. A water drain 107 is included in the system, along with piping 108 and 109 to emitters or nozzles for dispersing the combined fluids as appropriate. These prior art systems typically rely upon a water mist, which emitted in large volumes sufficient to cool a fire thereby removing heat, while others rely upon displacing oxygen with one or more gas or liquids in addition to or in place of the water. These latter systems often result in undesirable and problematic gas and/or liquid combinations that cause issues after extinguishment.

SUMMARY

The present system provides an integrated fire suppression system that includes all components controlled by a single integrated panel of various control electronics, while each component or group of components are located in different compartments of a specially configured cabinet. The system allows the entire panel and component compartments to be inspected and analyzed, and installed, repaired, or maintained in a single operation, dramatically reducing time to manufacture and time spent on-site after installation for periodic testing and maintenance, while also reducing the amount of time required for post-installation certifications and testing as well, since most testing and certification can be done during manufacture at a manufacturing site.

The assembly of the panel and components within the cabinet is completed at a manufacturing site away and off-site from the installation site. Typically the initial inspections of any qualifying agencies and resultant certifications can be performed during manufacture and thereafter at the manufacturing site, which saves considerable time in addressing inspection issues, all before installation and such that installation time can be substantially reduced since most certifications and inspections are completed prior to installation.

Once assembled, the system can remain at the manufacturing site, ready and qualified for rapid installation at any future time, which enables easy upgrades, system changes, and replacement of faulty panels or consumables prior to leaving the manufacturing site for subsequent installation. The system allows plug and play capability of the integrated panel, control electronics, and components during manufacture, installation, and/or replacement and maintenance operations after installation.

The panel includes a surrounding cabinet, with lockable doors to restrict access to the interior of the cabinet to ensure access is only permitted for qualified personnel. Inside, the cabinet defines a plurality of separate spaces and/or compartments that are designed to provide stability, easy operation and repair, and containment to specific compartments of potential leaks or malfunctions, such that problematic components in one compartment do not adversely affect components or component groups in another compartment, which protects such other components. The design of the overall system and cabinet is constructed to provide a low center of gravity to increase the stability of the cabinet even in the absence or failure of mounting straps. The design is such that even when mounted, the forces on the mounts are reduced due to the natural stability of the cabinet.

DETAILED DESCRIPTION OF THE SYSTEM

The system provides a unitized, compact, modular scalable set of cabinetry for containing fire suppression equipment, especially constructed for self-contained hybrid fire-extinguishing systems, which may use among other options, a combination of inert gas and water, atomized to a predetermined droplet size, to extinguish and suppress each of the four classifications of fire. Examples of embodiments of the system are illustrated in the various figures, including FIGS. 2 and 3.

Such new and novel systems, cabinets, and installations as described herein are contemplated to have constructions and arrangements that meet or exceed national industry standards. For purposes of example without limitation, such standards include those available from the CGA—Compressed Gas Association, ANSI—American National Standards Institute, ASME—the American Society of Mechanical Engineers, and ASTM International formerly known as the American Society for Testing and Materials, among others.

Of particular interest for purposes herein, attention is also invited especially to the NFPA—National Fire Protection Association standards available from the NFPA of Quincy, Massachusetts. Those knowledgeable in the field of technology should understand that the constructions and arrangements described herein will have particular importance to the fire protection industry, as such implementations herein meet or exceed NFPA industry standards. These standards include, for purposes of illustration, NFPA 13, *Standard for the Installation of Sprinkler Systems*, NFPA 70, *National Electrical Code*, NFPA 72, *National Fire Alarm and Signaling Code*, NFPA 750, *Standard on Water Mist Fire Protection Systems*, NFPA 770, *Hybrid* (*Water and Inert Gas*) *Fire-Extinguishing Systems*, and NFPA 2001, *Standard on Clean Agent Fire Extinguishing Systems*, among other related NFPA standards.

Figure 2:
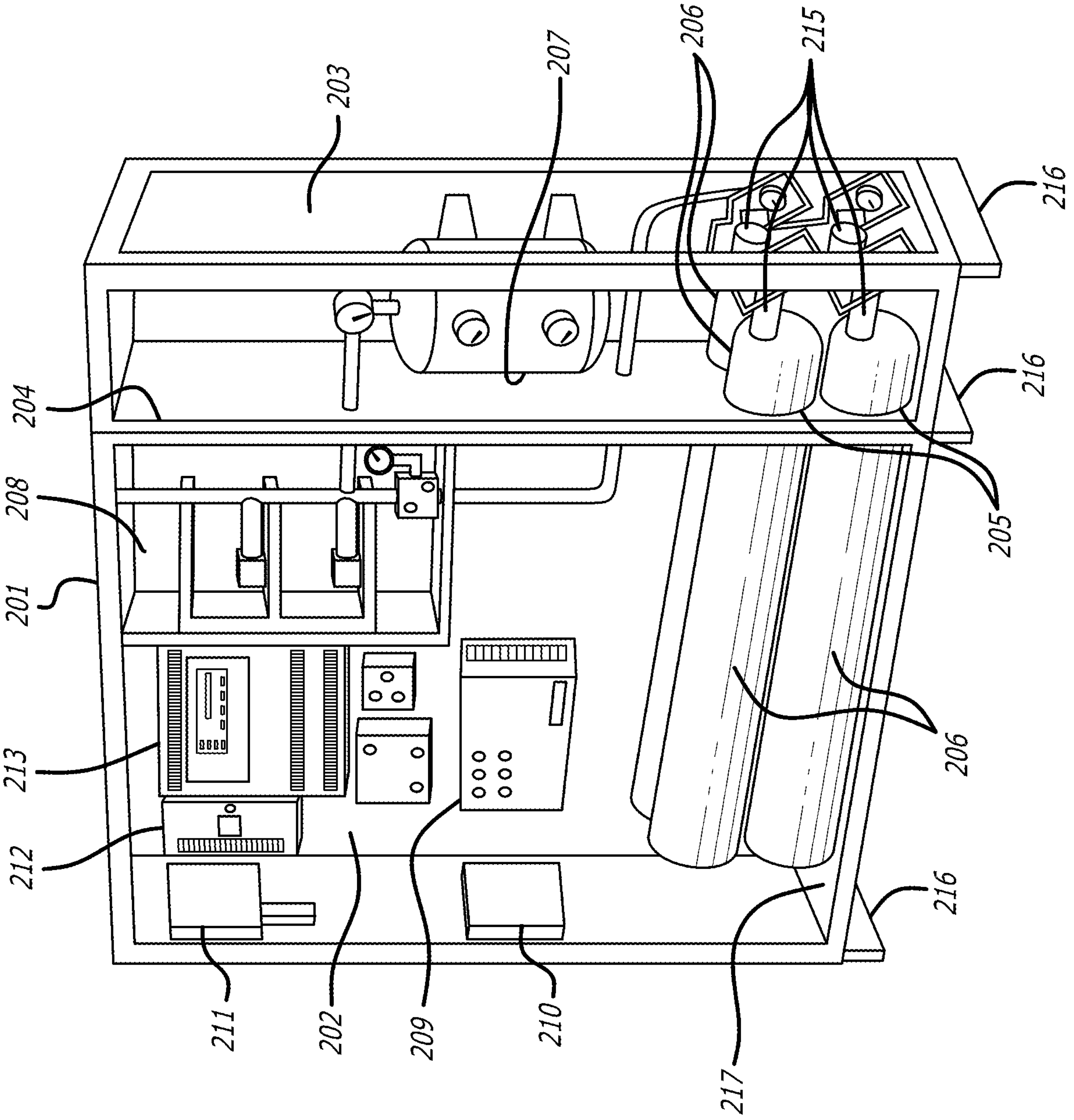
FIG. 2 is an embodiment of the system.

In one arrangement, the cabinet 201 is substantially rectangular and comprises a plurality of compartments such as compartments 202, 203, and 208 for receiving and isolating various components of the system. More compartments can be provided without departing from the scope and spirit of the system. The cabinet includes feet 216 that lift the bottom 217 of the cabinet above ground level to protect the interior from accumulation of fluid leaks, dirt, dust, and other foreign substances after installation. The example of FIG. 2 is shown without doors and side panel to illustrate the interior configuration of the cabinet 201.

In one embodiment cabinet 201 is comprised of steel with welded seams in addition to provide isolation of the interior components. The cabinet itself and/or the compartments therein may be a UL approved cabinet and/or compartment for containing electronic components. The cabinet in one embodiment includes a first section that is 72 H by 96 W by 34 D. A second section may be 72 H, by 24 W or wider, by 34 D, and is scalable to larger or smaller sizes. The design of the cabinet 201 serves a number of functions. One function is to isolate and contain fire suppression equipment in a single integrated location and cabinet, and to have separate compartments containing components or groups of components, wherein the compartments enable protection of such components or groups thereof within one compartment from possible damage due to a malfunction of a component in a different compartment.

The single cabinet design allows the system to be manufactured and assembled and certified in whole and/or in part during manufacture at a manufacturing site, and prior to installation, and then moved to the installation site while retaining all or most of the certification qualifications, thereby saving time and expense during installation. The separate compartments within the single cabinet reduces or eliminates the effect of possible system malfunctions or failures from impacting the operation of the remainder of the system. The single cabinet and separate compartment construction also enables easy maintenance and repair of the system after installation wherein like components are grouped together in each of the contemplated compartments.

The separation of regions of the cabinet into compartments adds to the effectiveness of the cabinet. Compartments 202 and 203 provide locations for various subsystems of the fire suppression system. Compartments 202 and 203 are separated by a wall 204 that includes openings 205 for the heads of the high pressure gas tanks 206 to extend into region 203. This unique design separates potential fluid leaks of the water tank and/or tank nozzles from sensitive instruments and controllers and electronics located in other compartments such as for example region 202.

Should the tank nozzles 215 on the gas tanks 206 fail, and/or should the water tank 207 leak, the fluid will be isolated and contained to respective regions 202, 203, protecting other equipment in the cabinet. The openings 205 that permit the tops of the tanks 206 to extend into region 203 can include gaskets, grommets, and/or other sealing mechanisms to provide isolation between the compartments. The gas tanks 206 may be nitrogen tanks for use in a hybrid media arrangement, such as for example a hybrid media, water/nitrogen fire extinguishing and/or suppression system, or a system that includes other chemical or inerting gases.

The contemplated hybrid media implementations of the disclosure are distinguished from water only misting and twin fluid water misting systems, which typically deliver at least a water mist having an average droplet size of between about 1,000 micrometers ("μm") and about 2,000 μm, and possibly a second non-water fluid. The delivery is achieved using a gas or fluid that is pressurized and which operates as a propellant to enable the discharge of the water mist and other possible fluid, wherein the emitted water mist travels downward towards the heat sources below the emitter and under the influence of gravity. In many applications, the water mist is designed to cool and extinguish the fire, but has been observed to introduce large amounts of water as required to extinguish a fire, which causes substantial damage to materials and equipment, due to the high rate of water delivered.

While the gas propellant of such water mist systems can often times include an inert gas, extinguishment of a fire results entirely from the water mist contacting the heat sources and becoming steam, which causes cooling that removes heat from the fire. Unlike the self-contained, integrated panel, and single cabinet apparatuses implemented according to the disclosure, such water only or twin fluid water systems are designed to utilize external water sources that can supply the required large volumes of water, as well as external pressurized gas propellant sources to propel the large volumes of water. In some systems, the pressurized propellant gas is also utilized to atomize and/or emulsify the water with the gas to increase cooling and extinguishment effectiveness.

Such water only and twin fluid water systems are not designed to emit, and are incapable of emitting enough inert gas in a large enough volume, into an enclosure or enclosed space, to cause extinguishment by reducing the oxygen concentration surrounding a fire. Instead, only a low volume of such inert gas, relative to the much larger volume of water, is pressurized and employed to propel the larger amount of water from a sprinkler.

In these water mist systems, the emitted water mist typically becomes steam upon contact with the heat sources of the fire, thereby cooling and causing extinguishment by breaking or removing the heat leg of the fire triangle. Some of such systems are known to those working in the field as being defined more specifically in NFPA 750, among other references, and which do not cover but exclude hybrid media systems. The various self-contained, single cabinet arrangements and apparatuses described herein are not contemplated and are incompatible for use with such water mist systems or with use of a gas propellant, since the systems described herein are self-contained and do not contain large volumes of water as required for water mist extinguishment.

For purposes of example without limitation, as referred to herein with respect to the apparatus of the disclosure, the phrase "hybrid media" should be understood by those knowledgeable in the relevant fields of technology to include, be established by, or meet or exceed the definition thereof described in NFPA 770. This standard explains that hybrid media is defined to be a fire extinguishing media that is formed and emitted to have both an inert gas agent and an atomized and/or nebulized water mist, which in combination both cool and reduce oxygen concentration to extinguish and suppress the fire, thereby concurrently removing two of the three legs or requirements needed to sustain a fire.

This hybrid media is delivered and discharged from internal and self-contained sources in the cabinet, to an enclosure or enclosed space with a controlled and predetermined design flow rate and a predetermined relative proportion between the constituents. The delivery and discharge includes simultaneous discharge from a single and/or common discharge device, such as an emitter or nozzle or sprinkler having specially sized and/or designed one or more orifices that deliver and/or emit the hybrid media to include the inert or inerting gas, and the atomized and/or nebulized water droplets to have a predetermined droplet size.

Such predetermined water droplet average sizes for purposes of the contemplated hybrid media systems implemented herein are less than or equal to 200 μm in average diameter, or more or less, according to and established as a function of a predetermined water operating pressure or range of pressures and specific fire extinguishment requirements. Those skilled in the relevant arts typically refer to average droplet size using a variable term of "$D_{v0.99}$", which refers to a droplet size average of the $99^{th}$ percentile of all measured, emitted drops. It has been observed experimentally that an average droplet size of less than or equal to 200 μm enables the implementations of the disclosure to emit water droplets that are emitted and suspended throughout the enclosure or enclosed space. This implementation substantially increases the effectiveness of and drastically reduces the volumetric amount of hybrid media required to extinguish and/or suppress a fire during operation of the contemplated fire suppressions systems herein.

When emitted, such specially sized water droplets behave much like suspended aerosols, wherein the droplets do not fall under the influence of gravity, but remain suspended and floating about the enclosed space or enclosure for substantially extended periods of time, when compared to prior art large water droplet (1,000 μm-2,000 μm) mist systems. The increased time of suspension about the environment of the enclosure or enclosed space, enables increased effectiveness of the water droplets, which have been determined by experimentation to readily move by Brownian motion and convection currents throughout the environment of the enclosure or enclosed area. In this way, the implementations and constructions of the disclosure generate more specially sized water droplets that are available to and that will contact heat sources, removing heat therefrom and turning to steam. This action thereby cools the fire or heat source and removes the second heat leg of the fire triangle, which acts in combination with the effects of the inerting gas that removes the oxygen leg of the fire triangle.

The present disclosure is further directed to implementations that establish the concurrent discharge of inert or inerting gas, from internal and self-contained sources, as part of the emitted hybrid media, in a sufficient volume and volumetric flow rate to lower oxygen concentration in an enclosed space or enclosure. During operation the emitted inert or inerting gas modifies the atmosphere by reducing the concentration of oxygen, below the threshold needed to support combustion, in the enclosure or enclosed space where fire is detected and to be extinguished and/or suppressed.

The apparatus of the disclosure is constructed with valves, solenoids, and control electronics to thereby establish, during operation, an oxygen concentration that is less than or equal to 16 percent. Such components are typically arranged and constructed to deliver the hybrid media from internal and self-contained sources, and to emit this hybrid media of both inert gas and droplets of water in volumes and at rates designed to flood the enclosure or enclosed space within and/or during a predetermined period of time. Other ranges of oxygen concentration may be preferred for certain applications and environments and for certain types of combustible and/or flammable materials, liquids, and/or gases. In these arrangements, the inerting effect of a reduced oxygen concentration breaks a leg of the fire triangle as noted, and which acts in combination with the specially sized, cooling water droplets.

In the arrangements herein, such contemplated inert gas agents may include, for purposes of further illustration, an agent that includes one or more primary constituents such as, for example without limitation, argon, helium, neon, and nitrogen. In further optionally preferred variations, the agent may further include secondary constituents that are blended therewith in predetermined proportions, such as carbon dioxide, which proportions are established as a function of the specific application and materials, liquids, and/or gases for which fire protection is required.

In variations, the contemplated water mist component of the hybrid media should be understood by the skilled artisan to be modified, modifiable, controllable, and controlled by the valves, solenoids, control electronics, and emitters or nozzles described herein. The contemplated emitters and/or nozzles are designed and constructed with and incorporate one or more orifices that are sized and adjusted for operation with a predetermined emitter or nozzle internal operating pressure, which enables the orifices to emit the required volume of hybrid media, which includes the water droplets of predetermined size.

In one arrangement, such one or more orifices are constructed to have a diameter or diameters of 200 μm that enables emission of the water droplets to have the predetermined size of less than or equal to 200 μm. In variations, such one or more orifices are each sized to have a diameter of less than or equal to 200 μm, wherein each or all such orifices may have respective diameters of an identical size, different sizes, and combinations of groups of orifices with identically and differently sized diameters, all being less than or equal to the predetermined size of 200 μm.

The contemplated emitters or nozzles are further constructed to have each and/or all of the one or more orifices in fluid communication with either the internal water source, or the internal inert gas source, or both. In modifications, each such orifice may be constructed about the emitter and/or nozzle to be in fluid communication with either or both of the water or inert gas sources.

In all implementations, the emitters and/or nozzles are constructed to generate, during operation, the emitted hybrid media at predetermined volumetric flows as a function of the predetermined internal operating pressures, and wherein the emitted hybrid media is delivered at a relatively low pressure that is above that of the enclosure or enclosed space, but below the internal operating pressure. Such predetermined operating pressures and/or volumetric flow rates may be fixed, and in alternative arrangements, one or more of the valves, solenoids, control electronics, and emitters or nozzles, are automatically adjustable during operation and in response to a detected fire, to adjust the predetermined operating pressures and/or volumetric flow rates. Such a relatively low operating pressure may range between about 5% and about 20% above the ambient atmospheric pressure (assumed to be on average about 14.7 pounds per square inch or 1,013 millibars absolute) of the environment of the enclosure or enclosed space.

The predetermined operating pressures for each of the inert gas or gases, and the water are adjusted, in combination with the construction of the orifice or orifices of the emitters and nozzles, to establish predetermined volumetric flow rates of emitted hybrid media, in sufficient quantity to enable the desired fire protection application. In further variations, each of the constituent inert gases or gases, and the water may be supplied to the nozzles and emitters with identical, similar, and/or different respective operating pressures, to establish an overall or aggregate volumetric flow rate of the emitted hybrid media, as well as to establish respective volumetric flow rates for each constituent and/or combinations of such constituents.

In a variation, these emitters or nozzles are constructed to emit the hybrid media to include the inert gas agent at a predetermined gas operating pressure, and water spray droplets at a predetermined water operating pressure. Such pressures may be identical, similar, or different and may be adjustable. The emitters or nozzles are selected or constructed with one or more orifices that are sized to, at a predetermined gas and a predetermined water operating pressure, emit, a predetermined size according to application requirements directed to fire extinguishment and/or suppression of certain combustible and/or flammable materials, liquids, and/or gases.

Such one or more orifices may be differently sized from one another, and may be in fluid communication with either the inert gas supply or the water supply, or both. In these arrangements, the emitters or nozzles may in the alternative, concurrently emit from each of the one or more orifices a combination of the hybrid media that includes both the inert gas and the water. In other adaptations, one or more orifices may emit either the inert gas or the water separately.

Figure 1:
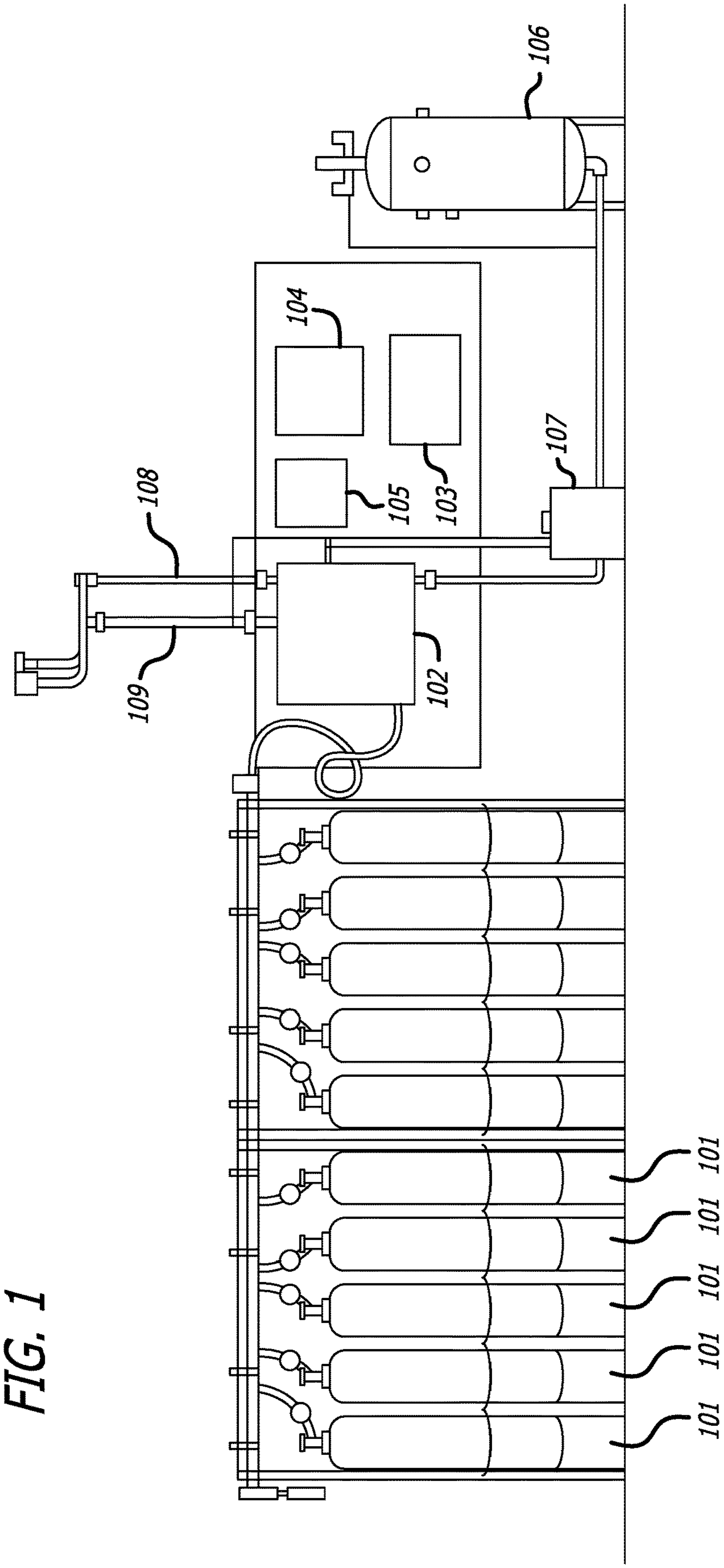
FIG. 1 is an example of a prior art system.

Another advantage of the design of the cabinet is natural stability. The cabinet is designed for heavier components to be at the bottom of the cabinet and for those components themselves to be in their most stable configuration. For example, the gas tanks 206 are located in a more stable arrangement than typical vertical wall racks (such as shown in FIG. 1). The center of gravity of the tanks is such that the tanks are already at a stable location (whereas vertical tanks could fall down). The tanks comprise the heaviest component of the system. In the event of an earthquake, the heavy tanks are already stabilized through this design. In addition, the tanks 206, being the heaviest item in the integrated cabinet, provide stability to the cabinet overall, which is part of the earthquake readiness of the system. The tanks can be installed vertically upright in one embodiment, whereby, the profile would be lessened.

The system includes valves and solenoids in compartment 208, also in a defined space with walls around the region, which are individually adjustable to control the respective predetermined pressures of the water and the inert gas, and of the emitted hybrid media. This area is another area of potential leaks, so by keeping it separated from other electrical components with the physical barrier of compartment 208, robust protection is provided to the system. In one embodiment, compartment 208 may have its own independent and separate door to provide further isolation and protection of the components within and in other compartments. In one embodiment, compartment 208 is located within compartment 203 to isolate fluid related components in a group and a single location. In one embodiment, enclosure 203 contains a control system for an emitter or nozzle-based system such as the Vortex system manufactured by Victaulic of Easton, Pennsylvania.

Such systems as disclosed herein provide a water-sparse, hybrid media solution for fire extinguishment and/or suppression, using high velocity and volume, low pressure discharge by the nozzles of such hybrid media. Such high velocity and high volume is defined as a function of the volume of the enclosure and/or enclosed space and to establish a time within which the emitted hybrid media will flood the pace sufficient to extinguish and suppress the fire by cooling and reducing the oxygen concentration to less than 16%. The low pressure discharge or emission is determined relative to ambient and/or atmospheric pressure in the space, such that it may range between about 5% and 10% thereof, or more or less. It should be noted that the system may be implemented with any manufacturer's components. Electrical control components 209-213 are provided in the remainder of the cabinet 201, mounted securely per IBC (International Building Code) or NQA-1 requirements in compartment 202.

These electrical control components 209-213 are constructed and connected to operate and adjust the valves and solenoids, and thereby to control the predetermined operating pressures and volumetric flow rates of the hybrid media and its constituents being emitted during fire extinguishment and suppression.

All connections between the components in the panel are made during assembly at the manufacturing location, and prior to installation. In one embodiment, the panel communicates with the remainder of the system through a minimum of connection points. For example, the system includes a power interconnect, plumbing interconnect for integration with the fire suppression piping system, and a communications port (in addition to available wireless control as desired) and a BACnet gateway, also known as a building automation and control network, which is an ISO standard communication protocol available from bacnet.org. These interconnects may be at the top, sides, and/or back of the cabinet as desired. In one embodiment, the connections are situated so as to be easily accessible during installation, operation, and maintenance of the system.

In one embodiment, the fittings of the cabinet connect to a piping system where nozzles may be distributed throughout the protected enclosure or enclosed space. In another embodiment, the cabinet will include the contemplated fluid nozzles or emitters mounted on top of the cabinet itself, without the need for additional piping and plumbing. In this embodiment, the system is self-contained and no additional piping is required. The cabinet can be in wired or wireless communication with sensors and activate upon detection of an alarm condition.

In one embodiment, fluid connections are black steel, stainless steel, and fittings may be via malleable iron fittings (black or galvanized). All piping includes pipe hangers and support bracket to support the dead load of the piping system. Rigid support is provided at all direction changes as needed per local codes and authorities having jurisdiction.

Figure 3:
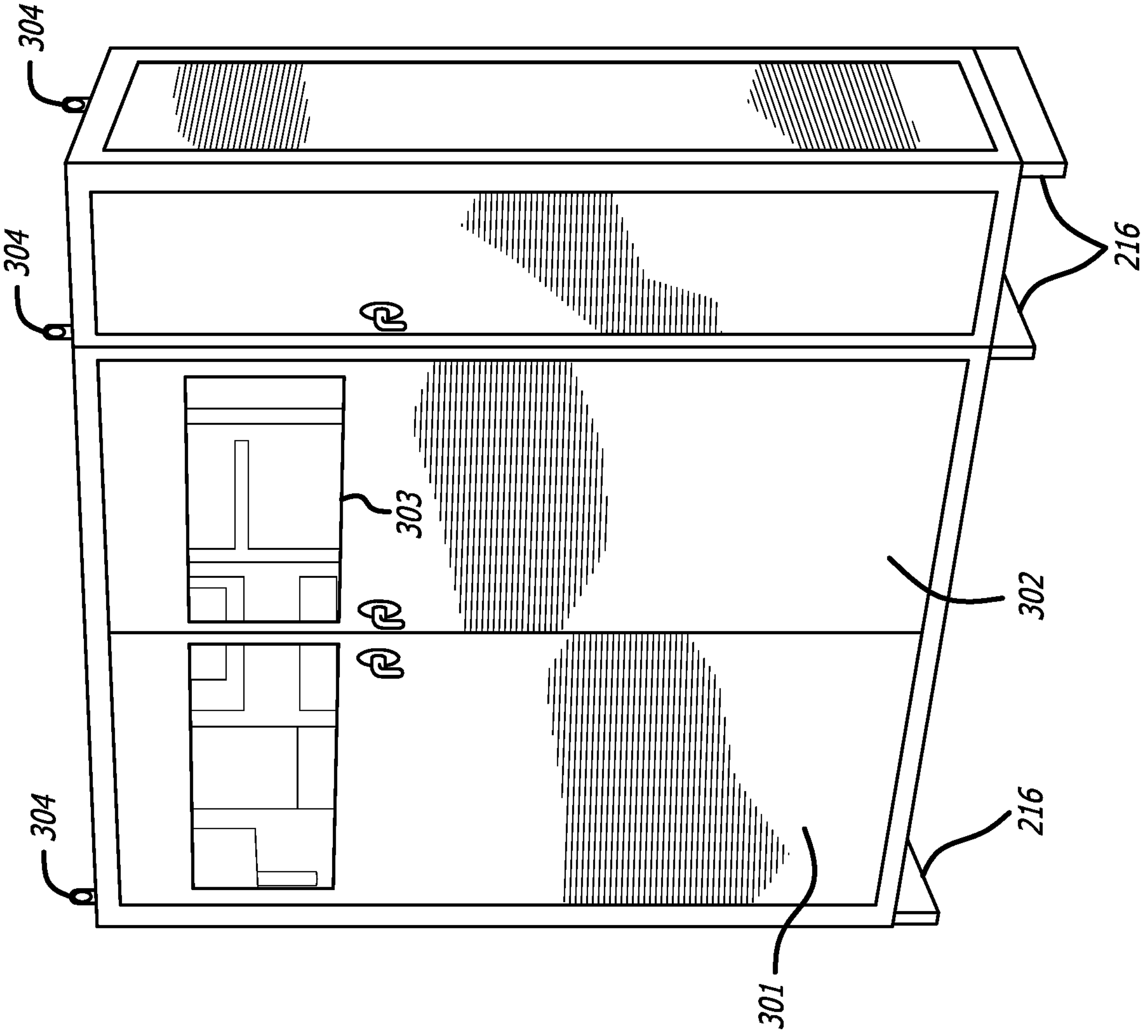
FIG. 3 is an embodiment of the system with doors.

In one embodiment, the panel includes double doors 301 as shown in FIG. 3 to further protect the system. The doors may have windows 303 so that visual monitoring of the system may take place without compromising the environmental protection that the doors provide. On the doors there will be a dashboard or other display to indicate system status. In one embodiment, the doors include 3-point locking handles 302 (e.g. T handles), which when locked engages and joins the door and the cabinet about three points. The doors 301 include gaskets and seals to provide additional environmental isolation of the cabinet 201.

As show in FIG. 3, the cabinet 201 includes integrated mounting eyes 304 for mounting and stabilizing the cabinet against a wall. Other mounting locations can be integrated into the system without departing from the scope and spirit of the system.

The system is scalable, and it is contemplated that additional cabinets and compartments can be attached and integrated into the system as needed, both at the assembly location or the installation location.

When the detection devices detect an event, there is a set of contact closures that will start off a chain of events. Remote alarms in local and off site or manned supervisory points will receive annunciation from the panel. The panel will energize a solenoid and valve to allow high pressure gas to open the pilot bottle valves to allow gas to flow to the emitter(s). At that time the control system will signal an end drive to rotate and control a needle valve or a pressure reducing device to maintain and to adjust the amount of gas to be delivered as appropriate. At the same time the water solenoid opens and pressurized water flows to the nozzle and/or emitter with the gas, which establish a fine mist of the contemplated hybrid media to suppress and extinguish the detected fire and alarmed event.

What is claimed is:

1. An integrated fire suppression system, comprising:

a cabinet including a plurality of environmentally isolated compartments;

a first walled compartment;

a plurality of fire suppression control systems received and mounted in the first walled compartment and including electrical components and controls for at least one of water and gas solenoids, adjustable during operation to enable emission of a hybrid media, high pressure tank nozzles, and an emitter having at least one orifice sized for a predetermined operating pressure that during operation emits the hybrid media with inert gas and water mist having a predetermined droplet size;

a second walled compartment laterally adjacent to the first walled compartment and having fluid storage and high pressure gas components, and an opening defined between the first and second walled compartments;

a third walled compartment further including solenoid and actuator systems; and at least one high pressure tank containing the inert gas and disposed in both the first and second walled compartments, the at least one high pressure tank mounted in a horizontal orientation with a first end in the first walled compartment and a second end in the second walled compartment, wherein the tank includes a nozzle that extends through the opening and into the second walled compartment, wherein the opening is sealed around the tank to isolate the first walled compartment from the second walled compartment, and wherein the plurality of fire suppression control systems are mounted in the first walled compartment above the at least one high pressure tank.

2. The system of claim 1, further comprising:

the cabinet securely mounts heavier components contained therein on a bottom of at least one of the first and second walled compartments, to stabilize the cabinet with the mass of such components.

3. The system of claim 1, further comprising:

the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

4. The system of claim 1, further comprising:

at least one emitter nozzle mounted to the cabinet to extend into an exterior environment and configured to enable emission of the hybrid media as a fire suppressant during operation.

5. The system of claim 1, further comprising:

a plurality of preinstalled interconnects extending exteriorly from the cabinet, including at least one electrical, communication, and plumbing interconnect, each configured to connect components of the cabinet to exterior infrastructure.

6. The system of claim 1, further comprising:

the emitter control configured to connect with and control an exterior high velocity, low pressure hybrid media fire suppression system.

7. The system of claim 1, further comprising:

the cabinet including a plurality of feet extending from a bottom of the cabinet, and configured to elevate the cabinet above a ground surface upon installation.

8. The system of claim 1, further comprising:

the sealing mechanisms include at least one of a gasket and a grommet.

9. The system of claim 1, further comprising:

a plurality of doors each having seals configured to environmentally isolate each compartment from the others, when the doors are closed, and from an exterior environment.

10. The system of claim 1, further comprising:

the cabinet including at least two doors each having seals configured to isolate each compartment from the other and an exterior environment, when the doors are closed, such that a first door isolates the first compartment from the others, and a second door isolates the second and third compartments from each other and the first compartment.

11. An integrated fire suppression system, comprising:

a cabinet including three compartments defined by walls that isolate the compartments from each other and an exterior environment;

the first walled compartment mounting a plurality of fire suppression control systems including electrical components and controls for at least one of adjustable water and gas solenoids that during operation enable emission of a hybrid media, high pressure tank nozzles, and an emitter;

the second walled compartment laterally adjacent to the first walled compartment and having fluid storage and high pressure gas components, and an opening defined between the first and second walled compartments;

the third walled compartment further including solenoid and actuator systems; and at least one high pressure tank containing an inert gas and disposed in both the first and second walled compartments, the at least one high pressure tank mounted in a horizontal orientation with a first end in the first walled compartment and a second end in the second walled compartment, wherein the tank includes a nozzle that extends through the opening into the second walled compartment, wherein the opening is sealed around the tank to isolate the first walled compartment from the second walled compartment, and wherein the plurality of fire suppression control systems are mounted in the first walled compartment above the at least one high pressure tank.

12. The system of claim 11, further comprising:

the cabinet including at least two doors each having seals configured to isolate each compartment from each other and the exterior environment when the doors are closed, such that a first door isolates the first compartment, and a second door isolates the second and third compartments.

13. The system of claim 11, further comprising:

the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

14. The system of claim 11, further comprising:

at least one emitter nozzle mounted to the cabinet to extend into the exterior environment and configured to enable emission of the hybrid media as a fire suppressant thereto during operation.

15. The system of claim 11, further comprising:

a plurality of preinstalled interconnects extending exteriorly from the cabinet, including at least one electrical, communication, and plumbing interconnect, each configured to connect components of the cabinet to exterior infrastructure.

16. The system of claim 11, further comprising:

the emitter control configured to connect with and control an exterior high velocity, low pressure hybrid media fire suppression system.

17. An integrated fire suppression system, comprising:

a cabinet including three compartments defined by walls and doors configured, when the doors are closed, to isolate the compartments from each other and an exterior environment;

the first walled compartment mounting a plurality of fire suppression control systems including electrical components and controls for at least one of adjustable water and gas solenoids, high pressure tank nozzles, and an emitter that during operation emits water and gas as a hybrid media;

the second walled compartment having fluid storage and high pressure gas components, and an opening defined between the first and second walled compartments;

the third walled compartment further including solenoid and actuator systems; and at least one high pressure tank disposed in both the first and second walled compartments, the at least one high pressure tank mounted in a horizontal orientation with a first end in the first walled compartment and a second end in the second walled compartment, wherein the tank includes a nozzle that extends through the opening into the second walled compartment, wherein the opening is sealed around the tank to isolate the first walled compartment from the second walled compartment, and wherein the plurality of fire suppression control systems are mounted in the first walled compartment above the at least one high pressure tank.

18. The system of claim 17, further comprising:

the doors each having seals configured to environmentally isolate each compartment from each other and the exterior environment, such that a first door isolates the first compartment from the others, and at least one additional door isolates the other compartments.

19. The system of claim 17, further comprising:

the at least one of fluid storage and high pressure gas components include high pressure tanks that are the heaviest components of the cabinet, and which are positioned to have respective centers of gravity arranged at the lowest point within the cabinet, to stabilize the cabinet with the mass of the tanks.

20. The system of claim 17, further comprising:

at least one emitter nozzle mounted to the cabinet to extend into the exterior environment and configured to enable emission of the hybrid media as a fire suppressant thereto during operation.

* * * * *